US010437338B2

(12) United States Patent
Kato

(10) Patent No.: US 10,437,338 B2
(45) Date of Patent: Oct. 8, 2019

(54) VIBRATION-MECHANISM-EQUIPPED INPUT DEVICE

(71) Applicant: ALPINE ELECTRONICS, INC., Tokyo (JP)

(72) Inventor: Kazunari Kato, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 15/896,525

(22) Filed: Feb. 14, 2018

(65) Prior Publication Data

US 2018/0299959 A1 Oct. 18, 2018

(30) Foreign Application Priority Data

Apr. 12, 2017 (JP) ................................ 2017-079065

(51) Int. Cl.
| | | |
|---|---|---|
| *G06F 3/01* | (2006.01) | |
| *G06F 3/0354* | (2013.01) | |
| *G06F 3/041* | (2006.01) | |
| *G06F 3/0488* | (2013.01) | |

(52) U.S. Cl.
CPC .......... *G06F 3/016* (2013.01); *G06F 3/03547* (2013.01); *G06F 3/041* (2013.01); *G06F 3/0416* (2013.01); *G06F 3/0488* (2013.01); *G06F 2203/014* (2013.01)

(58) Field of Classification Search
None
See application file for complete search history.

(56) References Cited

U.S. PATENT DOCUMENTS

| | | | |
|---|---|---|---|
| 2011/0267551 A1* | 11/2011 | Yokote | G06F 1/1643 348/836 |
| 2011/0314267 A1 | 12/2011 | Watanabe et al. | |
| 2012/0235939 A1 | 9/2012 | Sakaguchi et al. | |
| 2015/0357132 A1 | 12/2015 | Ishikawa et al. | |
| 2016/0027263 A1* | 1/2016 | Parker | H02N 2/043 340/407.1 |
| 2017/0280234 A1* | 9/2017 | Choi | G06F 1/1605 |
| 2018/0081446 A1 | 3/2018 | Wakuda | |
| 2018/0369865 A1* | 12/2018 | Shoji | H04M 19/04 |

FOREIGN PATENT DOCUMENTS

| | | |
|---|---|---|
| EP | 3 086 207 A1 | 10/2016 |
| JP | 2015-230620 A | 12/2015 |
| JP | WO2017/010171 A1 | 1/2017 |
| WO | WO 2017/010171 A1 | 1/2017 |

OTHER PUBLICATIONS

European Search Report for Application No. EP18166815.3 dated Jun. 18, 2018; 9 pages.
European Office Action for Patent Application No. 18 166 815.3 dated Jul. 10, 2019; 7 pages.

* cited by examiner

*Primary Examiner* — Brian M Butcher
(74) *Attorney, Agent, or Firm* — Brinks Gilson & Lione

(57) ABSTRACT

A vibration-mechanism-equipped input device includes a manipulation part on which the manipulator can perform an input manipulation, one end of a bracket being attached to the manipulation part, a vibration generating part that generates vibration to be transmitted to the manipulation part, and a controller that controls the operation of the vibration generating part. The vibration generating part is attached to another end of the bracket, the position of the other end being offset from the one end of the bracket.

7 Claims, 4 Drawing Sheets

VIBRATION-MECHANISM-EQUIPPED INPUT DEVICE

RELATED APPLICATION

The application claims priority to Japanese Patent Application Number 2017-079065, filed Apr. 12, 2017, the entirety of which is hereby incorporated by reference.

BACKGROUND

The present disclosure relates to a vibration-mechanism-equipped input device and, more particularly, to a vibration-mechanism-equipped input device that is suitable to applications in which the input device is used as a stationary device such as when the input device is mounted in a vehicle.

BRIEF SUMMARY

Input devices that accept an input manipulation when a manipulation surface is touched, as with touch panels, are widely used. As to this type of input device, to improve maneuverability, a vibration-mechanism-equipped input device is preferred that adds vibration to a manipulation surface at the time of a manipulation so that the manipulator has a pseudo manipulation feeling. As to this type of vibration-mechanism-equipped input device, an input device equipped with a vibration mechanism (force feedback) described in, for example, Japanese Unexamined Patent Application Publication No. 2015-230620 is known.

The vibration mechanism described in Japanese Unexamined Patent Application Publication No. 2015-230620 has a first bumper member that is elastic and is disposed at a position at which the first bumper member can come into contact with the lower surface of a manipulation part and a second bumper member that is elastic and is disposed between part of an actuator and the upper surface or lower surface of a case member. These bumper members eliminate an inertial force with which the manipulation part in a predetermined orientation is about to move in a predetermined direction, and urge the manipulation part to move in the opposite direction with their elastic return force. This makes it possible to smoothly switch the direction in which the manipulation part is driven from the upward direction to the downward direction. Since the driving direction of the manipulation part is smoothly switched in this way, the manipulation part can be driven without sluggish movement. Therefore, it is possible to provide an input device equipped with force feedback that gives a sharp manipulation feeling.

SUMMARY

Touch panels are being widely used not only in mobile terminals such as smartphones but also in stationary use applications such as vehicle-mounted navigation systems. In stationary use applications, particularly in on-vehicle applications, to achieve advanced functions and assure superior design, touch panels have been increasingly demanded to have a large screen and to be made thinner.

When a vibration-mechanism-equipped input device has a large screen, the weight of the touch panel is generally increased. Accordingly, the vibration mechanism is demanded to generate a large vibration force. If a conventional mechanism is utilized, as in the past, the vibrator tends to become large. Although a large vibrator can satisfy the demand for a touch panel with a large screen, the large vibrator cannot satisfy the demand for a thin touch panel.

The present disclosure addresses the above situation with the object of providing a vibration-mechanism-equipped input device that satisfies a demand for enlarging and thinning an input device such as a touch panel.

In one aspect, to solve the above problem, there is a vibration-mechanism-equipped input device that has: a manipulation part on which the manipulator can perform an input manipulation, one end of a bracket being attached to the manipulation part; a vibration generating part that generates vibration to be transmitted to the manipulation part; and a controller that controls the operation of the vibration generating part. The vibration generating part is attached to another end of the bracket, the position of the other end being offset from the one end of the bracket.

With conventional vibration-mechanism-equipped input devices, a vibration generating part that vibrates a manipulation part is generally provided in the vicinity of the center of gravity of the manipulation part so that the manipulation part generates highly even vibration. In the most general case, if the manipulation part to be vibrated is a touch panel, a vibration generating part such as a vibrator is attached to the central portion of the rear surface, which is opposite to the manipulation surface of the touch panel. In this case, the attached vibration generating part protrudes from the rear surface of the manipulation part. If the manipulation part is large, its weight is increased, and the vibration generating part inevitably becomes large. This makes it difficult to satisfy a demand for thin thickness if a vibration mechanism has a structure in which a vibration generating part is attached to the rear surface of a manipulation part.

If a vibration mechanism has a structure in which a vibration generating part is attached to a fixed part that supports a manipulation part and the manipulation part is displaced, the vibration generating part does not need to be positioned in the vicinity of the center of gravity of the manipulation part. Therefore, this type of vibration mechanism can satisfy the demand for thin thickness. In this structure, however, the vibration generating part is placed side by side with the manipulation part when viewed from the manipulator's side. This imposes a limitation when the ratio of the area of the manipulation part to the area of the outside shape of the input device is to be increased. Therefore, a vibration mechanism having this structure is not acceptable in an on-vehicle application or another application in which a superior design is emphasized.

In view of the above, it is an object of the present disclosure to provide a vibration mechanism that satisfies the demand for a large size and a thin thickness without affecting a superior design. As described herein, the present disclosure is directed to a structure in which a manipulation part and a vibration generating part are spaced apart from each other and they are linked together with a bracket. Since the vibration generating part is spaced apart from the manipulation part, even if the vibration generating part is enlarged to adapt to an input device, including the manipulation part, that is, the vibration generating part is enlarged and its weight is thereby increased, the input device can remain thin. The bracket attached to the manipulation part is preferably formed from a material as thin as possible within a range in which its mechanical property is not impeded.

With the vibration-mechanism-equipped input device described above, the vibration generating part may be able to generate vibration at least in a direction deviating from a line that connects the one end and other end of the bracket together; the manipulation part may have a buffer part that eliminates a vibration component in a direction along the line from vibration components generated by the vibration generating part. When the manipulation part has this type of buffer part, it is possible to lessen an influence on the in-plane evenness of vibration generated in the manipulation part, the influence being caused by the direction of vibration generated by the vibration generating part and the position on the manipulation part at which the one end of the bracket is attached. Therefore, even if the input device (touch pad) is enlarged, the high in-plane evenness of vibration can be easily maintained.

The vibration-mechanism-equipped input device described above may further have a fixed part that is placed so as to cover at least part of the rear surface of the manipulation part; the fixed part may suspend the manipulation part in a free direction through a support part. When the fixed part is provided, the vibration-mechanism-equipped input device can be easily mounted in a vehicle or another target in which to mount the input device.

When the fixed part described above is provided, the buffer part is preferably composed of the support part. Since the support part suspends the manipulation part in a free direction, if this support part functions as the buffer part, vibration from the vibration generating part can be easily controlled.

With the vibration-mechanism-equipped input device described above, the vibration generating part may be placed so that a line passing through the center of gravity of the manipulation part and extending vertically passes through the center of vibration of the vibration generating part when viewed along the normal of the manipulation surface of the manipulation part. When the vibration generating part is placed like this, the evenness of vibration of the manipulation part, which is caused by vibration of the vibration generating part, can be increased in the manipulation surface.

With the vibration-mechanism-equipped input device described above, the line passing through the center of gravity of the manipulation part and extending vertically may pass through a portion at the one end of the bracket, the portion being attached to the manipulation part, when viewed along the normal of the manipulation surface of the manipulation part. When the one end of the bracket is attached to the manipulation part like this, the evenness of vibration of the manipulation part, the vibration being caused by vibration of the vibration generating part, can be increased in the manipulation surface.

With the vibration-mechanism-equipped input device described above, the vibration generating part preferably vibrates in a direction along an in-plane direction of the manipulation surface of the manipulation part. When the vibration generating part vibrates in a direction along an in-plane direction, vibration generated in the manipulation part is also in a direction along an in-plane direction. Vibration in an in-plane direction is preferable because this type of vibration is easily transmitted to the manipulator as a manipulation feeling. Particularly, when the vibration-mechanism-equipped input device is mounted in a vehicle, vibration in the vertical direction is not easily transmitted to the manipulator as a manipulation feeling. When the vibration generating part vibrates in a direction along a line of intersection of the manipulation surface and a horizontal plane, vibration is efficiently transmitted easily to the manipulator as a manipulation feeling.

The vibration mechanism of the vibration-mechanism-equipped input device in the present disclosure has a structure in which a vibration generating part spaced apart from a manipulation part is linked to it with a bracket. This structure can satisfy a demand for a large and thin screen required for recent stationary input devices.

DETAILED DESCRIPTION OF THE DRAWINGS

Figure 1A:
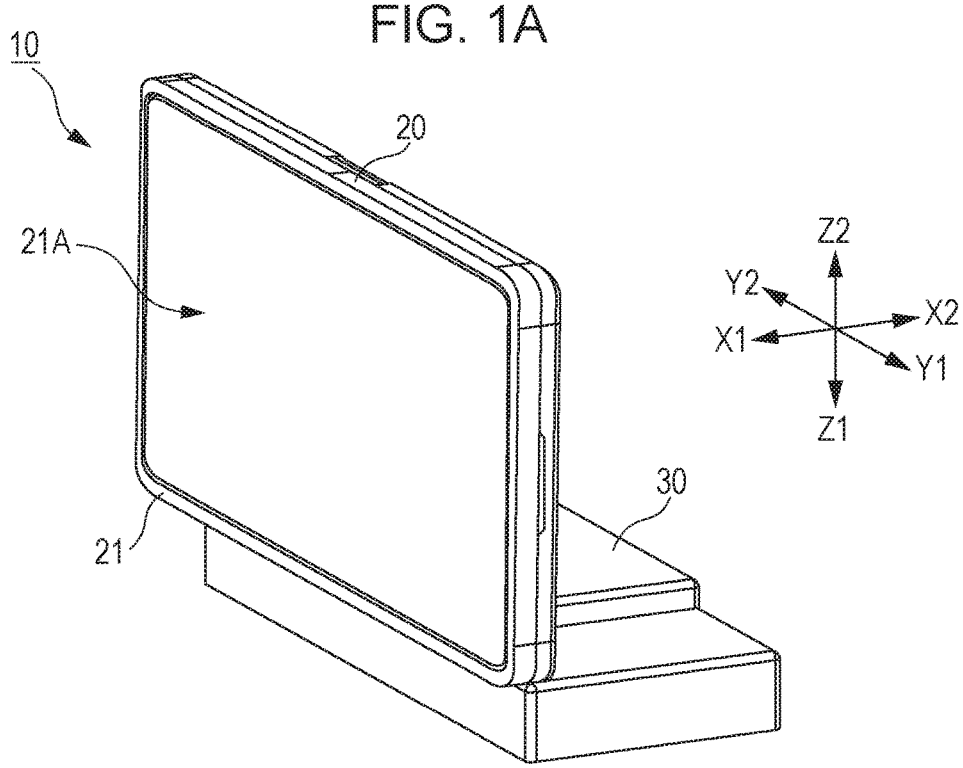
FIGS. 1A and 1B are each an external view of a vibration-mechanism-equipped input device according an embodiment of the present disclosure, the input device in FIG. 1A being viewed in a direction in which the manipulation surface of the input device is visible, the input device in FIG. 1B being viewed in a direction in which the rear surface of the input device is visible.
Figure 1B:
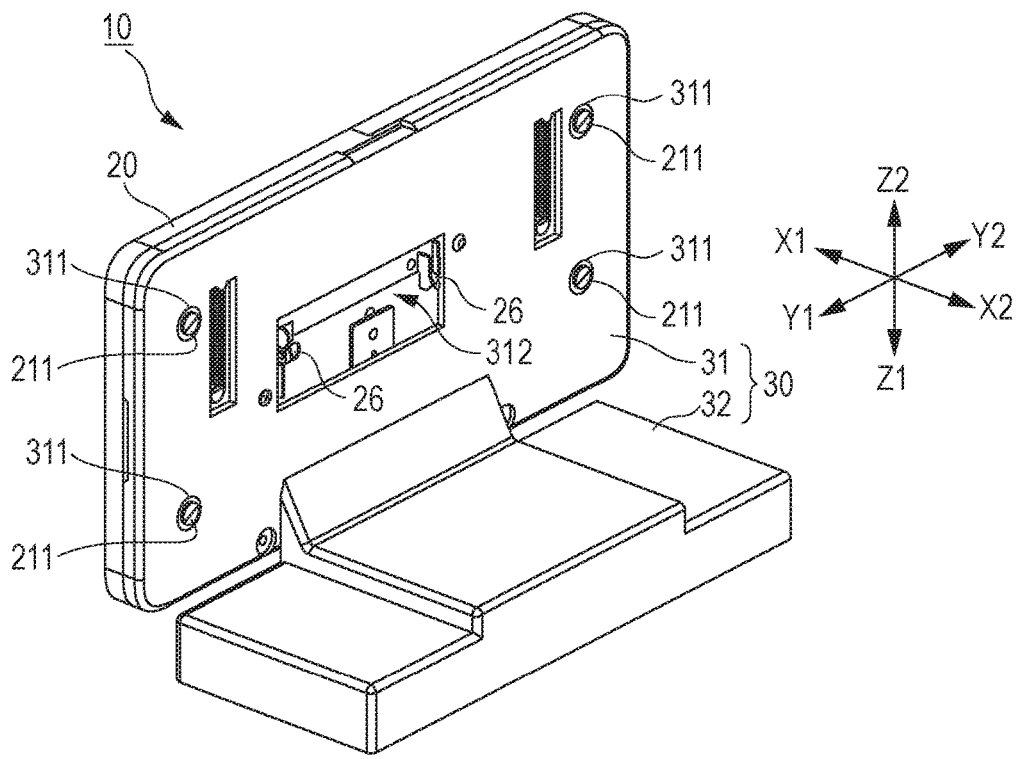
Figure 2A:
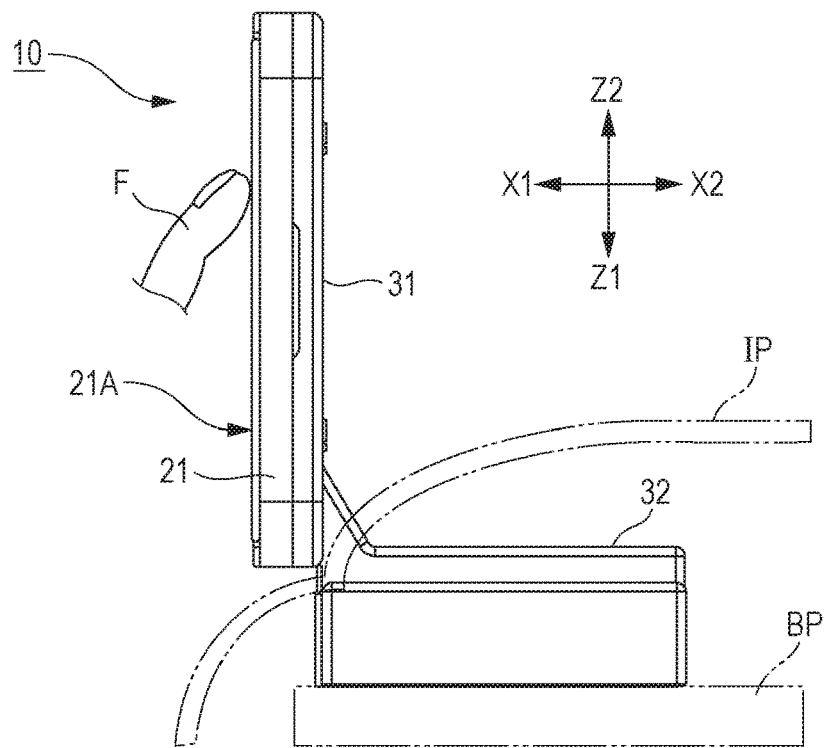
FIG. 2A is a side view of the vibration-mechanism-equipped input device according the embodiment of the present disclosure.
Figure 2B:
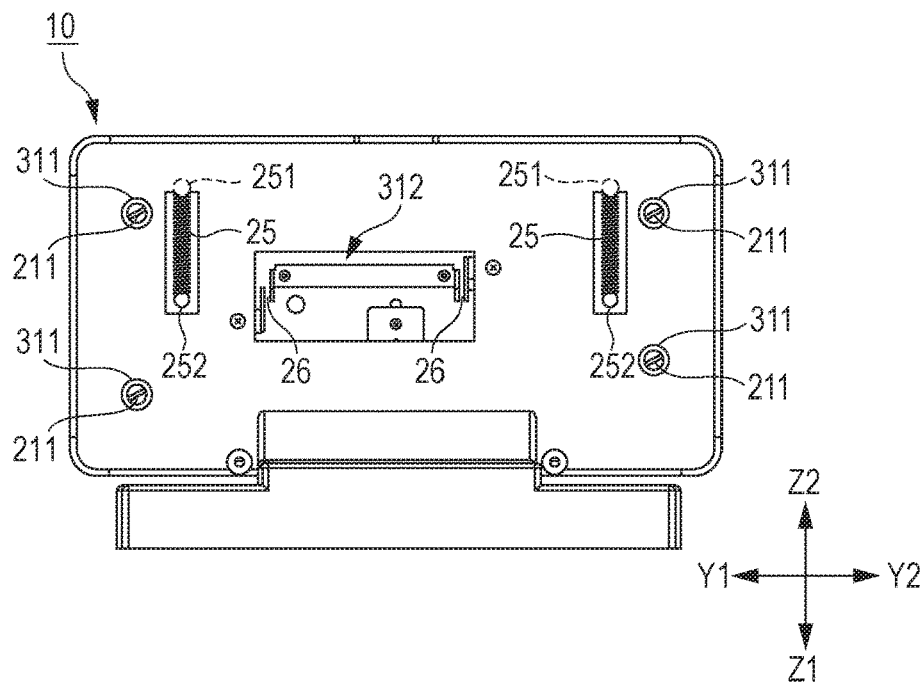
FIG. 2B is a rear view of the input device.
Figure 3A:
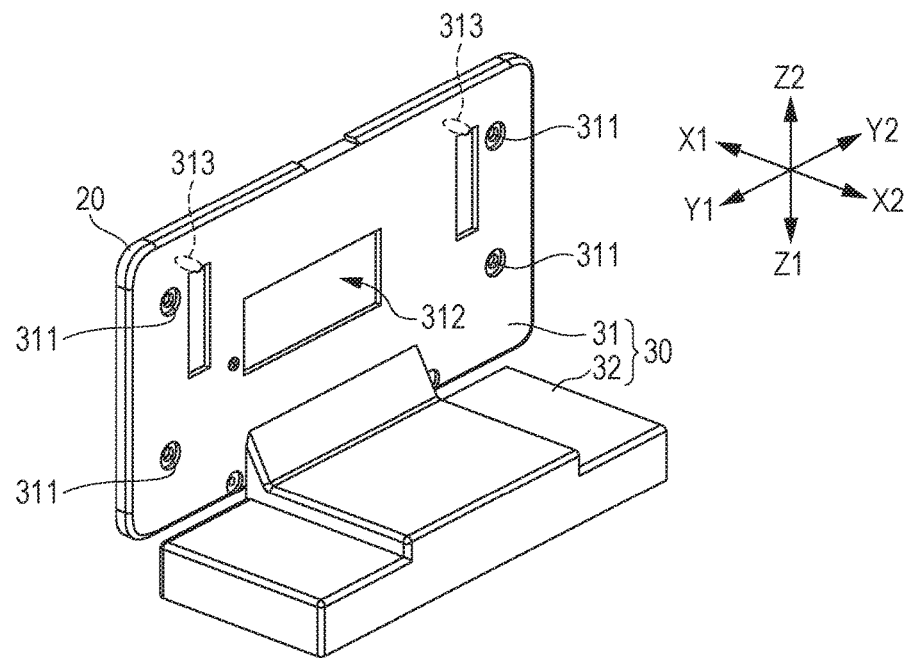
FIG. 3A is an external view illustrating the structure of a fixed part of the vibration-mechanism-equipped input device according the embodiment of the present disclosure.
Figure 3B:
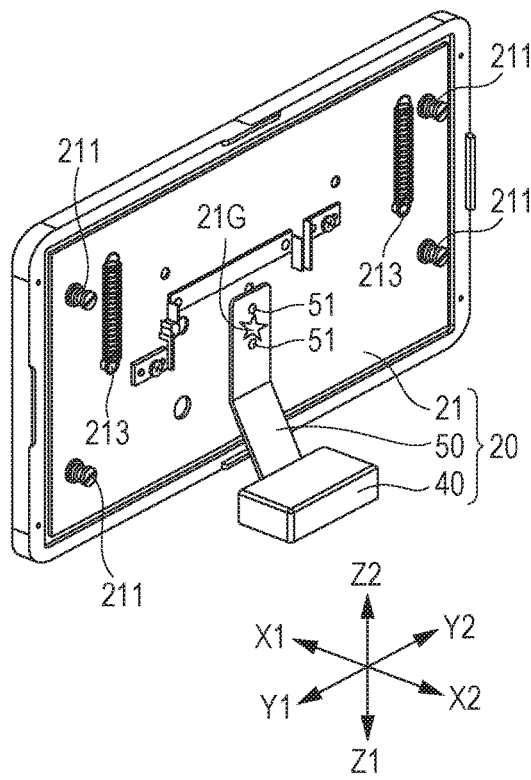
FIG. 3B is an external view illustrating the structure of a movable part of the input device.
Figure 3C:
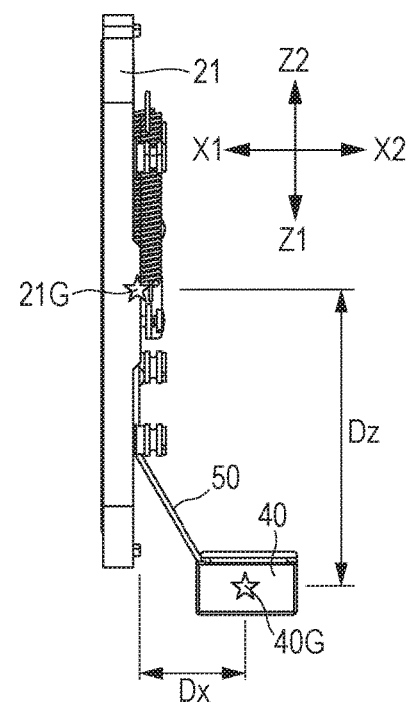
FIG. 3C is a side view illustrating the structure of the movable part.

An embodiment of the present disclosure will be described below with reference to the drawings. FIGS. 1A and 1B are each an external view of a vibration-mechanism-equipped input device according an embodiment of the present disclosure; the input device in FIG. 1A is viewed in a direction in which the manipulation surface of the input device is visible, and the input device in FIG. 1B is viewed in a direction in which the rear surface of the input device is visible. FIG. 2A is a side view of the vibration-mechanism-equipped input device according the embodiment of the present disclosure, and FIG. 2B is a rear view of the input device. FIG. 3A is an external view illustrating the structure of a fixed part of the vibration-mechanism-equipped input device according the embodiment of the present disclosure, FIG. 3B is an external view illustrating the structure of a movable part of the input device, and FIG. 3C is a side view illustrating the structure of the movable part.

As illustrated in FIGS. 1A to 3C, the vibration-mechanism-equipped input device 10 according to an embodiment of the present disclosure has a movable part 20 equipped with a manipulation part 21 having a manipulation surface 21A that accepts an input manipulation when a manipulation region (such as, for example, a finger F) of the manipulator comes into contact with the manipulation surface 21A. The vibration-mechanism-equipped input device 10 also has a display chassis 30 having reception through-holes 311, into each of which a hinge 211 of the movable part 20 snaps so as to support the manipulation part 21. The manipulation surface 21A is disposed on the X1 side of the manipulation part 21 of the movable part 20 in the X1-X2 direction. On the X2 side in the X1-X2 direction, although not illustrated, a touch panel, which may be of an electrostatic type or a resistive type, and a display device such as, for example, a liquid crystal display device or an organic electroluminescent (EL) display device are placed.

The display chassis 30, which is L-shaped, has a fixed part 31, the outside shape of which extends in the Z1-Z2 direction when viewed in the Y1-Y2 direction. The display chassis 30 also has a base 32, the outside shape of which extends in the X1-X2 direction when viewed in the Y1-Y2 direction. The reception through-holes 311 described above are formed in the fixed part 31 to support the manipulation part 21. The base 32 has linkage parts (not illustrated) connected to a mounting body BP, such as a vehicle, to which the vibration-mechanism-equipped input device 10 is attached. In FIG. 2A, an outer panel IP is indicated by dash-dot-dot lines; the outer panel IP is placed so as to cover the mounting body BP and base 32. If the mounting body BP is part of a vehicle, the outer panel IP is part of an instrument panel or dashboard. A bracket 50 linked to the manipulation part 21 and a vibration generating part 40 linked to the bracket 50 are placed in the base 32, as described later. Thus, the base 32 suppresses the influence of external foreign matter on vibration transmitted from the vibration generating part 40 to the manipulation part 21. The operation of the vibration generating part 40 is controlled by a controller (not illustrated). The controller is placed at, for example, a position on the base 32 at which interference with the operation of the vibration generating part 40 does not occur.

In addition to the hinges 211, the vibration-mechanism-equipped input device 10 has support parts 25 as members that restrict a range within which the position of the manipulation part 21 relative to the fixed part 31 can be changed, as illustrated in FIG. 2B.

The support part 25 is an elastic body that expands and contracts in the Z1-Z2 direction. Specifically, the support part 25 is a coil spring; the support part 25 is fixed to the display chassis 30 at an end 251 on the Z2 side in the Z1-Z2 direction and is also fixed to the manipulation part 21 on an end 252 on the Z1 side in the Z1-Z2 direction. Therefore, the fixed part 31 of the display chassis 30 suspends the movable part 20 including the manipulation part 21 in a free direction through the support parts 25. If a special external force (including a vibration force generated by the vibration generating part 40) is not applied, the free direction is the vertical direction (Z1-Z2 direction).

A perforated part 312 is formed at the central portion of the fixed part 31 of the display chassis 30 in the X1-X2 direction. The perforated part 312 is used to restrict a range within which the relative positions of the manipulation part 21 and fixed part 31 in the Y1-Y2 direction can be changed. In the perforated part 312, vibration restricting bumper mechanisms 26 are provided that restrict vibration transmitted from the vibration generating part 40 to the manipulation part 21.

As illustrated in FIGS. 3A and 3B, the fixed part 31 of the display chassis 30 holds the movable part 20 including the manipulation part 21 so as to be able to vibrate, due to the reception through-holes 311 into which the hinges 211 are inserted and pins 313 at which the ends 251 stop, each end 251 being at one end (on the Z2 side of the Z1-Z2 direction) of the relevant support part 25. The other ends (on the Z1 side of the Z1-Z2 direction) of the support parts 25 support the manipulation part 21 at pins 213 provided on the manipulation part 21. Each hinge 211 has a bushing formed from an elastic body. The bushing comes into contact with the reception through-hole 311. Since the hinge 211 has a bushing formed from an elastic body as described above, it is possible for the manipulation part 21 to be held to the fixed part 31 and to vibrate within a predetermined range. If the vibration-mechanism-equipped input device 10 lacks support parts 25, the whole of the vertical force of the manipulation part 21 due to its own weight is exerted on the bushings of the hinges 211. Since the vibration-mechanism-equipped input device 10 has the support parts 25, however, part of the vertical force of the manipulation part 21 is exerted on the support parts 25, reducing a force exerted on the bushings. This prolongs the life of the bushings.

As illustrated in FIG. 3B, one end of the bracket 50 on the Z2 side in the Z1-Z2 direction is attached to the manipulation part 21 of the movable part 20 with attachment screws 51 so that the center 21G of gravity of the manipulation part 21 becomes the center of connection when viewed from the X1-X2 direction. As illustrated in FIG. 3C, the bracket 50 has a bent shape one end of which extends toward the Z2 side in the Z1-Z2 direction and another end of which extends toward the X2 side in the X1-X2 direction, when viewed from the Y1-Y2 direction. The vibration generating part 40 is attached to the other end on the X2 side in the X1-X2 direction.

As illustrated in FIG. 3C, therefore, the vibration center 40G of the vibration generating part 40 is offset from the center 21G of gravity of the manipulation part 21 toward the X2 side in the X1-X2 direction by a distance Dx, and is also offset toward the Z2 side in the Z1-Z2 direction by a distance Dz. Since the vibration generating part 40 is placed at a position offset from the center 21G of gravity of the manipulation part 21 in this manner, the vibration generating part 40, which generates a large vibration force, can be mechanically linked to the manipulation part 21 without having to enlarge the outside shape of the manipulation part 21, specifically without having to increase its thickness in the X1-X2 direction, its width in the Y1-Y2 direction, and its height in the Z1-Z2 direction. Therefore, the vibration-mechanism-equipped input device 10 having this structure can appropriately satisfy the demand for a large size and a thin thickness. If the vibration-mechanism-equipped input device 10 is mounted in a vehicle, particularly placed so that the manipulation part 21 protrudes from an instrument panel, the vibration generating part 40 is preferably placed in the base 32 of the display chassis 30 and the whole of the base 32 is preferably placed inside the instrument panel so that the vibration generating part 40 is not visible to the user.

Figure 4A:
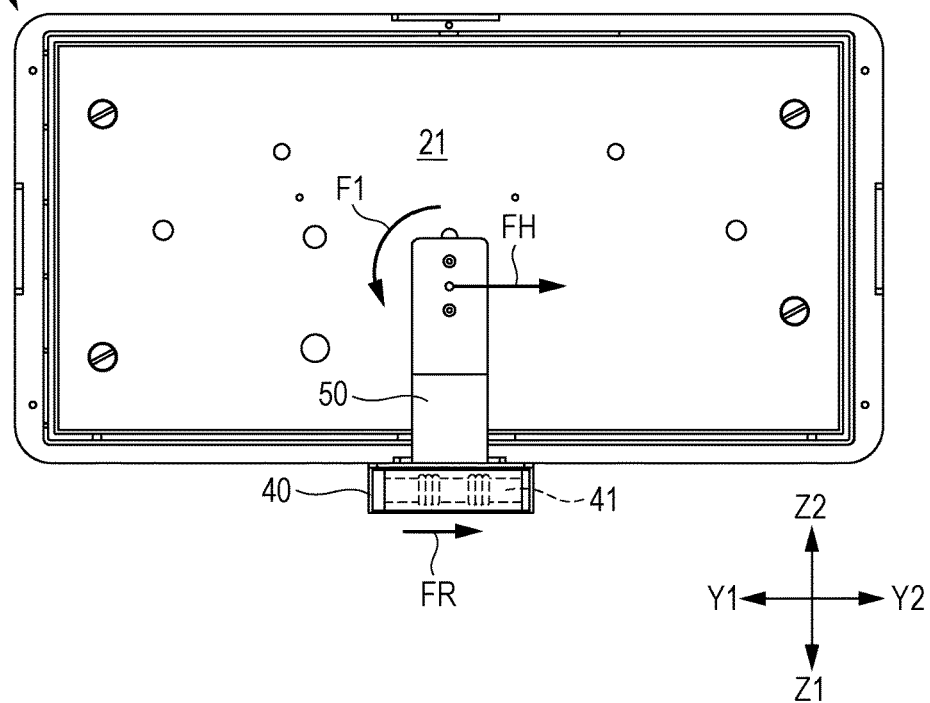
FIGS. 4A and 4B illustrate operations of the vibration-mechanism-equipped input device according the embodiment of the present disclosure, FIG. 4A illustrating the structure of the movable part from which support parts (buffer parts) are eliminated to explain a basic operation, FIG. 4B illustrating the structure of the movable part in which the support parts (buffer parts) are included to explain the function of the support part (buffer part).
Figure 4B:
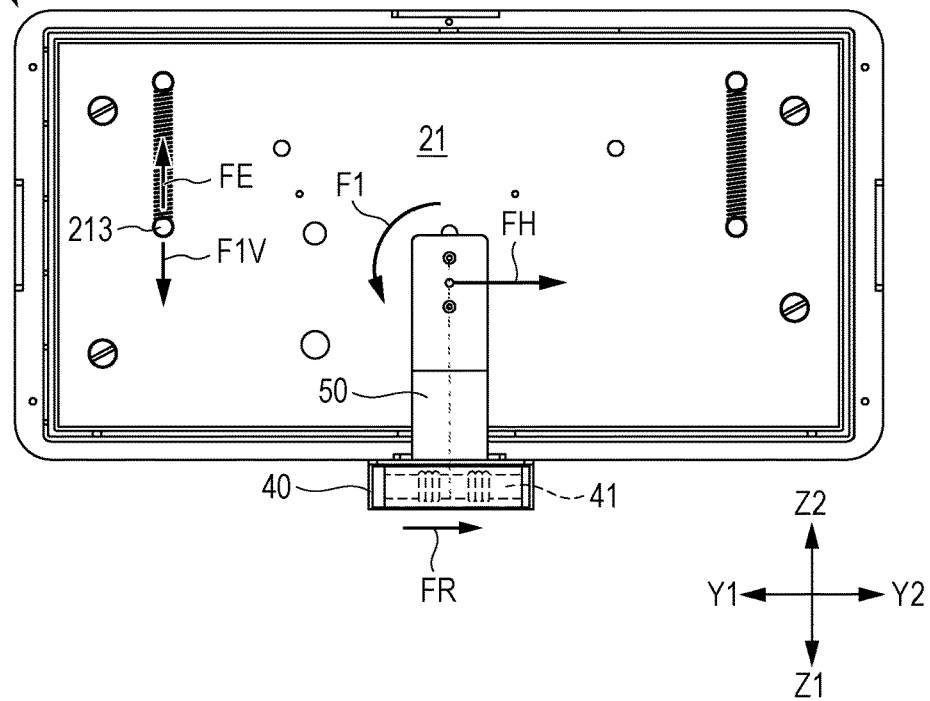

Next, the vibration mechanism, implemented by the vibration generating part 40, of the manipulation part 21 will be described with reference to FIGS. 4A and 4B. FIGS. 4A and 4B illustrate operations of the vibration-mechanism-equipped input device 10 according to an embodiment of the present disclosure; FIG. 4A illustrates the structure of the movable part 20 from which the support parts 25 (buffer parts) are eliminated to explain a basic operation, and FIG. 4B illustrates the structure of the movable part 20 in which the support parts 25 (buffer parts) are included to explain the function of the support parts (buffer parts).

As illustrated in FIG. 4A, a vibration generating device 41 is incorporated into the vibration generating part 40. The vibration generating device 41 illustrated in FIG. 4A is structured so that it internally has a plunger with a weight between two solenoid coils and that when this weight moves between the two solenoid coils, vibration is generated. Therefore, vibration generated by the vibration generating device 41 is in the Y1-Y2 direction. However, there is no particular limitation on a relation between the manipulation surface 21A and the direction in which the vibration generating device 41 generates vibration. If the manipulation surface 21A is positioned in a Y-Z plane, the vibration generating device 41 may vibrate in a direction having a component in an in-plane direction (in the Y1-Y2 direction and/or in the Z1-Z2 direction) as described above. Alternatively, the vibration generating device 41 may vibrate in a direction having a component in the normal direction (X1-X2 direction) of the manipulation surface 21A. To efficiently transmit vibration to the manipulator, the vibration generating device 41 preferably vibrates in a direction having a component in an in-plane direction (in the Y1-Y2 direction and/or in the Z1-Z2 direction). In an on-vehicle application, since vibration is substantially continuously generated in the vehicle in the Z1-Z2 direction, a vibration component in the Z1-Z2 direction is not felt by the manipulator. Therefore, when the vibration-mechanism-equipped input device 10 is mounted in a vehicle, the direction of vibration generated by the vibration generating part 40 preferably has a component in the Y1-Y2 direction as illustrated in FIG. 4A and more preferably has a component substantially only in the Y1-Y2 direction.

The bracket 50 may be made of any material if the material can appropriately transmit vibration generated by the vibration generating part 40 to the manipulation part 21. To reduce the thickness of a portion that the manipulator directly views, the portion including the manipulation part 21, the bracket 50 is preferably as thin as possible. Non-restrictive examples of materials of the bracket 50 include steel plates, copper alloy plates, and aluminum alloy plates. The bracket 50 can be manufactured by appropriately bending any of these plates.

When the vibration generating device 41 in the vibration generating part 40 operates and the vibration center 40G thereby moves toward the Y2 side in the Y1-Y2 direction as illustrated in FIG. 4A, a vibration force FR is generated toward the Y2 side in the Y1-Y2 direction. This vibration force FR is transmitted to the bracket 50 connected to the vibration generating part 40 at the other end of the bracket 50. The vibration force FR is also transmitted to the manipulation part 21 at the one end of the bracket 50 and then becomes a translational force FH that moves the manipulation part 21 toward the Y2 side in the Y1-Y2 direction. Similarly, when the vibration generating device 41 in the vibration generating part 40 operates and the vibration force FR is generated toward the Y1 side in the Y1-Y2 direction, the translational force FH is generated in the manipulation part 21 toward the Y1 side in the Y1-Y2 direction. Since the vibration generating device 41 in the vibration generating part 40 reciprocates in the Y1-Y2 direction, therefore, the translational force FH that causes the manipulation part 21 to reciprocate in the Y1-Y2 direction is generated and the manipulation part 21 thereby vibrates.

The vibration center 40G and the center 21G of gravity are mutually offset by distance Dz. When the vibration force FR is generated by the vibration generating device 41, therefore, not only the translational force FH but also a moment around the center 21G of gravity are generated in the manipulation part 21. Specifically, when the vibration force FR is generated toward the Y2 side in the Y1-Y2 direction, a counterclockwise moment is generated in the manipulation part 21. Therefore, all of the vibration force FR from the vibration generating device 41 does not become the translational force FH, but part of the vibration force FR is exerted on the manipulation part 21 as a rotational force F1 based on the moment, as illustrated in FIG. 4A. Since the rotational force F1 is in a direction in a Y-Z plane, when part of the vibration force FR becomes the rotational force F1, the vibration direction of the manipulation part 21 has not only a component in the Y1-Y2 direction but also a component in the Z1-Z2 direction.

As described above, when the vibration-mechanism-equipped input device 10 is mounted in a vehicle, the vibration component in the Z1-Z2 direction becomes a non-felt component. With the vibration component based on the rotational force F1, the component being in the Z1-Z2 direction, becomes large, therefore, essential vibration felt by the manipulation part (finger F, for example) of the manipulator that comes into contact with the manipulation surface 21A becomes smaller than when there is no rotational force F1, that is, there is only the translational force FH.

In view of this, the vibration-mechanism-equipped input device 10 has the support parts 25 composed of two coil springs as buffer parts, as illustrated in FIG. 4B. These support parts 25 suppress the deformation of the manipulation part 21 in the vertical direction (Z1-Z2 direction) due to the rotational force F1. Specifically, the vertical component F1V of the rotational force F1 is mitigated by an elastic contraction force FE. As a result, the vibration force FR is more efficiently converted to the translational force FH, so the vibration of the manipulation part 21 in the Y1-Y2 direction is efficiently generated. To have the support part 25 appropriately fulfill the above function, the elastic coefficient of the support part 25 is preferably high. Therefore, the support part 25 does not need to be a so-called spring with a low elastic coefficient; the support part 25 may be formed from a rod-like steel material or the like or from a wire.

When the vibration-mechanism-equipped input device 10 has buffer parts as described above, even if the vibration generating part 40 can generate vibration toward a direction offset at least from a line that connects the one end of the bracket 50 and the other end of it (in FIG. 4B, the line is indicated by a dash-dot line), the direction of vibration of the manipulation part 21 can be appropriately controlled by eliminating a vibration component along the above line from vibration components generated by the vibration generating part 40 with the buffer parts.

As described above, the vibration-mechanism-equipped input device 10 according to an embodiment of the present disclosure has a structure in which the vibration generating part 40 spaced apart from the manipulation part 21 is linked to it with the bracket 50. This structure can satisfy a demand for a large and thin screen required for more recent stationary input devices.

So far, an embodiment and its application examples have been described. However, the present disclosure is not limited to these examples. For example, the scope of the present disclosure also includes embodiments obtained as a result of adding or deleting constituent element to or from the above embodiment, performing design changes to the above embodiment, or appropriately combining features in the above embodiment; an addition, deletion, design change, or combination is effected by a person having ordinary skill in the art without departing from the intended scope of the present disclosure.

For example, with the vibration-mechanism-equipped input device 10 described above, the one end of the bracket 50 on the Z2 side in the Z1-Z2 direction has been positioned so as to coincide with the center 21G of gravity of the manipulation part 21 when viewed from the X1-X2 direction. However, this is not a limitation. For example, the bracket 50 may be attached to the manipulation part 21 so that the one end of the bracket 50 on the Z2 side in the Z1-Z2 direction is positioned above the center 21G of gravity of the manipulation part 21 (that is, on the Z2 side in the Z1-Z2 direction) or below the center 21G of gravity of the manipulation part 21 (that is, on the Z1 side in the Z1-Z2 direction)

when viewed from the X1-X2 direction. In addition, although the vibration generating device 41 mounted in the vibration generating part 40 of the vibration-mechanism-equipped input device 10 has been structured so as to have two solenoids, this is not a limitation. Specific examples of vibration generating parts having another structure include a vibration generating part structured so as to have a member the center of gravity of which is at a position offset from the center of rotation of the rotational axis of a motor that rotates and a vibration generating part structured so as to have a voice coil in a basic structure.

While there has been illustrated and described what is at present contemplated to be preferred embodiments of the present disclosure, it will be understood by those skilled in the art that various changes and modifications may be made, and equivalents may be substituted for elements thereof without departing from the true scope of the disclosure. In addition, many modifications may be made to adapt a particular situation to the teaching of the disclosure without departing from the central scope thereof. Therefore, it is intended that this invention not be limited to the particular embodiments disclosed, but that the invention will include all embodiments falling within the scope of the appended claims.

What is claimed is:

1. A vibration-mechanism-equipped input device comprising:
    a manipulation part on which a manipulator can perform an input manipulation, the manipulation part having a center of gravity;
    a vibration generating part that generates vibration to be transmitted to the manipulation part, the vibration generating part being offset from the center of gravity of the manipulation part;
    a controller that controls an operation of the vibration generating part; and,
    a bracket that extends between the manipulation part and the vibration generating part, the vibration generating part being positioned behind the manipulation part at a location beyond an outer housing of the manipulation part;
    wherein the vibration generating part is attached to one end of the bracket, and wherein the manipulation part is attached to another end of the bracket;
    wherein the bracket transmits from the vibration generating part to the manipulation part, a vibration along an in-plane direction of a manipulation surface of the manipulation part; and,
    wherein vibration from the vibration generating part produces a rotational force that acts on the manipulation part.

2. The vibration-mechanism-equipped input device according to claim 1, wherein:
    the vibration generating part is able to generate vibration at least in a direction deviating from a line that connects the one end and the another end of the bracket together; and
    the manipulation part has a buffer part that eliminates a vibration component from vibration components generated by the vibration generating part in a direction along the line.

3. The vibration-mechanism-equipped input device according to claim 2, further comprising a fixed part that is placed so as to cover at least part of a rear surface of the manipulation part; wherein
    the fixed part suspends the manipulation part in a free direction through a support part.

4. The vibration-mechanism-equipped input device according to claim 3, wherein the buffer part is composed of the support part.

5. The vibration-mechanism-equipped input device according to claim 1, wherein the vibration generating part is placed so that a line passing through the center of gravity of the manipulation part and extending vertically passes through a center of vibration of the vibration generating part when viewed along a normal of a manipulation surface of the manipulation part.

6. The vibration-mechanism-equipped input device according to claim 1, wherein a line passing through the center of gravity of the manipulation part and extending vertically passes through a portion at the one end of the bracket, the portion being attached to the manipulation part, when viewed along a normal of a manipulation surface of the manipulation part.

7. The vibration-mechanism-equipped input device according to claim 1, wherein the vibration generating part vibrates in a direction along an in-plane direction of a manipulation surface of the manipulation part.

* * * * *